United States Patent [19]
Hoheneder

[11] Patent Number: 6,020,389
[45] Date of Patent: Feb. 1, 2000

[54] PROCESS FOR THE FOAMING OF ACYLOXYSILANE-CONTAINING SILICONE MASSES

[75] Inventor: Rudolf Hoheneder, Traunstein, Germany

[73] Assignee: Heidelberger Bauchemie GmbH, Heidelberg, Germany

[21] Appl. No.: 09/051,293

[22] PCT Filed: Aug. 30, 1996

[86] PCT No.: PCT/EP96/03816

§ 371 Date: Apr. 10, 1998

§ 102(e) Date: Apr. 10, 1998

[87] PCT Pub. No.: WO97/13804

PCT Pub. Date: Apr. 17, 1997

[30] Foreign Application Priority Data

Oct. 11, 1995 [DE] Germany ............... 195 37 771
Oct. 19, 1995 [DE] Germany ............... 195 38 957

[51] Int. Cl.$^7$ ....................... C08J 9/00
[52] U.S. Cl. ................... 521/128; 521/130
[58] Field of Search ................. 521/128, 130

[56] References Cited

U.S. PATENT DOCUMENTS 3,133,891  5/1964  Ceyzeriat et al. .
5,661,192  8/1997  Giraud ................................ 521/93

FOREIGN PATENT DOCUMENTS 416 229 A2  3/1991  European Pat. Off. .
416 516 A2  3/1991  European Pat. Off. .

*Primary Examiner*—Melvyn I. Marquis
*Assistant Examiner*—Mark W. Milstead
*Attorney, Agent, or Firm*—Foley & Lardner

[57] ABSTRACT

The present invention pertains to a process for foaming mixtures of bifunctionally-ending di-organopolysiloxanes and acyloxsilane cross-linking agents, involving the addition to the mixture of sufficient quantities of an ammonium, amino, sodium or potassiumn hydrocarbonate.

13 Claims, No Drawings

PROCESS FOR THE FOAMING OF ACYLOXYSILANE-CONTAINING SILICONE MASSES

The present invention concerns a process for the foaming of mixtures of at least bifunctionally-terminated diorganopolysiloxanes, acyloxysilane cross-linking agents, as well as possibly filling materials.

Such organopolysiloxane mixtures, also known as cold-vulcanising, monocomponent silicone rubbers, which possibly also contain suitable additives, pigments, colouring materials, oxidation-, heat- and light-protective pigments, as well as solvents and plasticisers, and, in a state ready for working up, are present in liquid or pasty form, are described as such in FR 1 198 749 or U.S. Pat. No. 3,133,891. The mixtures usually cross-link at room temperature with the take up of water from the surrounding atmosphere to give rubber-elastic polymers. As cross-linkers, there are used tri and higher functional acyloxysilane compounds which, by reaction with the polysiloxane or by hydrolysis, split off carboxylic acids and thus initiate the formation of a macromolecular meshwork. After hardening out has taken place, such masses are characterised by a good inherent adhesion to the most varied material surfaces and by a generally high stability against the action of temperature, light, moisture, as well as chemicals. Because of these properties, monocomponent silicone masses hardening with the splitting off of carboxylic acids are preferably used for sealing purposes.

A disadvantage of the described silicone masses is their low compressibility so that, in the case of use e.g. as packing cord, high application forces on the constructional parts to be sealed are necessary in order to achieve the desired compactness. For this reason, in technology there are often used foamable elastomers based on polyurethanes or on noble metal-catalysed, addition cross-linked silicone masses of vinyl group-containing siloxanes and hydrogen siloxanes for the production of seals. However, the field of use of polyurethane systems is restricted by their limited stability against the action of higher temperatures and also by certain chemical materials. Foamable noble metal-, preponderantly platinum-catalysed addition cross-linking silicone masses, admittedly have a substantially higher temperature stability but have the disadvantage that these products have no or only a very small inherent adhesion to the materials to be sealed. Furthermore, in the reactive state, thus before foaming up and hardening, these systems are extremely susceptible to certain chemical materials, especially sulphur- and nitrogen-containing compounds which, already in the cases of traces, inhibit the catalyst system of these products and can thus suppress their foaming up and hardening. An application of addition cross-linking silicone foam systems to materials which contain such catalyst poisons is thus not possible (cf. EP 0 416 229-A2 and EP 0 416 516-A2).

On the other hand, the initially mentioned acyloxysilane cross-linking silicone masses display a sufficient stability at higher temperatures of use and in the case of chemical stressing. The cross-linking system of these products is insensitive towards sulphur- and nitrogen-containing compounds. Furthermore, acyloxysilane cross-linking silicones display inherent adhesion to many usual, especially silicate materials.

However, the hardening of these monocomponent polysiloxane mixtures cross-linking at room temperature with take up of moisture takes place comparatively slowly since the water necessary for the reaction must diffuse in gaseous form from the surrounding atmosphere into the interior of the mass. Therefore, the speed of the hardening through decreases continuously with progressing reaction into the interior of the mass. In the case of low moisture of the surrounding atmosphere or in the case of an unfavourable ratio of surface to volume of the silicone mass, the reaction can become very slow or, as in vapour-tight sealed off rooms, can also come to a complete stop. Because of this only slow hardening, atmospheric moisture cross-linking acyloxysilane-containing silicone masses cannot be foamed with known procedures, such as e.g. by mixing with propellant gases. The resulting foam would collapse within a short time. The acceleration of the hardening by addition of liquid water is admittedly mentioned in U.S. Pat. No. 3,133,891 but is not practicable because of the difficulties with a homogeneous distribution.

The task forming the basis of the invention thus consists in the making available of a process for the foaming of silicone masses based on acyloxysilane cross-linking polysiloxane mixtures, whereby these are to harden within a short time, i.e. within a few minutes, with foaming in order to prevent a collapsing of the foamed up material. The typically advantageous characteristics of the previously known vulcanisates arising in the case of atmospheric moisture cross-linking, such as for example inherent adhesion and stability, are thereby to be substantially retained.

The task is solved in that, to the initially mentioned and as such known monocomponent, acyloxysilane cross-linking silicone masses, is added, immediately before their use, a hydrogen carbonate as propellant and cross-linking agent. Ammonium hydrogen carbonate is thereby preferred, sodium or potassium carbonate or alkylamine hydrogen carbonates can also be added.

The acyloxysilane cross-linking silicone masses usable for the foaming are characterised in that they contain at least the following components.

A) 100 parts by wt. of an at least bifunctional diorganopolysiloxane terminated with silanol groups, whereby this is built up from a linear or branched chain of repeating units of the formula I

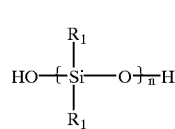

(I)

There hereby signify:

R$^1$: saturated or unsaturated hydrocarbon radicals with 1–10 C-atoms, possibly substituted with halogen or cyano groups, whereby the radicals R$^1$ within the polymer chain can be of different construction, n: a whole number of 1,500 to 10,000, B) 2 to 20 parts by wt. of an acyloxysilane cross-linker of the general formula II

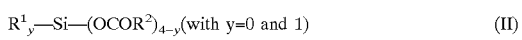

(II)

R$^2$: monovalent saturated hydrocarbon radical with 1 to 15 carbon atoms.

C) 0 to 100 parts by wt. of highly dispersed or precipitated silicic acids, the specific surface of which according to BET can lie in the range of 40 to 150 m$^2$/g.

As example for the radical R$^1$ of the component A are to be mentioned any desired alkyl radicals, such as methyl, ethyl, n-propyl, isopropyl, octyl, dodecyl, octadecyl, but also cyclic, such as cyclopentyl and cyclohexyl. Furthermore, there can be used unsaturated aliphatic and cycloaliphatic radicals, such as vinyl, allyl, cyclopentenyl or cyclohexenyl, and also aromatic, such as phenyl or naphthyl, and aliphatic-substituted aryl radicals, for example benzyl or toluyl. Within a polysiloxane, the radicals $R^1$ can be the same or different. It is also possible to mix branched and unbranched polysiloxanes with the above-described construction and in different chain length. Preferably, there are used polysiloxanes terminated with hydroxyl groups, so-called α,Ω-dihydroxydiorganopolysiloxanes with methyl and phenyl radicals.

The said radicals can also be used in halogen- and cyano-substituted form. Examples herefor are 1,1,1-trifluorotoluyl, β-cyanoethyl or o-, m- or p-chlorophenyl radicals.

The viscosity of the diorganopolysiloxanes preferably lies in the range of 6000 to 350000 mPas but can also lie outside of this range, for example when additional chain-lengthening agents and cross-linkers are contained.

In component B, additional compounds of the formula III

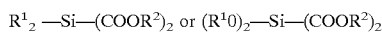
$$R^1_2\text{—Si—}(COOR^2)_2 \text{ or } (R^1O)_2\text{—Si—}(COOR^2)_2$$

can be used. These serve—preferably in combination with short-chained dihydroxydiorganopolysiloxanes—for the lengthening of the chains of the polysiloxanes used.

Instead of bringing together the components A and the components of the formula III with the mixing with components B, the reaction product of the two can also be previously produced and used directly.

To the mixtures of the components A to C can be added further materials for the achievement of special properties. To be mentioned here are especially colouring pigments and soluble dyestuffs, stabilisers against oxidation and the action of heat, dispersers, reaction catalysts (e.g. organotin compounds, titanium or zirconium esters), fungicides, bonding agents, solvents, flare-protective agents, plasticisers (preferably silicone oils but also based on hydrocarbons), strengthening filling agents, such as for example graphite or carbon black, as well as passive filling agents, such as e.g. calcium carbonate, silicates, quartz meal, glass and carbon fibres, diatomaceous earth, metal powder, as well as synthetic material powder.

Mixtures of the components A to C are storage-stable so long as a contact with moisture and alkalis is excluded.

For the foaming up and cross-linking acceleration, to these acyloxysilane-containing monocomponent silicone masses is added a hydrogen carbonate. The added amount of hydrogen carbonate preferably amounts to 1 to 1.3 mole per mol of acyloxy groups present in the silicone mass to be foamed. In principle, however, this amount can also be gone below or exceeded in order to influence the bubble picture, the density and the hardening time of the resulting foam and in order to adapt the total system to possibly given requirements or working parameters. In the case of underdosing, foams result of higher density with retarded hardening through. On the other hand, an overdosing leads to quicker foaming and hardening products with lower foam density. As cation in the hydrogen carbonate, ammonia is preferred, other avines, sodium or potassium are, however, also suitable.

Mixtures of the components A to C with hydrogen carbonate are not storage-stable. Therefore, the hydrogen carbonate necessary for the foaming and for the reaction acceleration is admixed in a suitable form with the mixture of the components A, B and C immediately before use, preferably, for the better mixing, pasted in silicone oils or polymers of type A.

For the reaction acceleration and foaming, there can be used a hydrogen carbonate of commercially usual quality, whereby this salt is to be present in the finest possible distribution, preferably with an average grain size of below 50 µm. It has proved to be advantageous to predisperse e.g. crystalline ammonium hydrogen carbonate in silicone oil or silicone polymer according to component A and further to homogenise this dispersion via a cylinder mill until the desired grain fineness is reached. For the avoidance of sedimentation phenomena during a possibly desired storage, additional highly dispersed silicic acid can be added to this pasting.

By means of this procedure, the silicone mass initially consisting of the components A, B and C can be admixed to the base components of a two-component silicone foam, the second component of which contains a hydrogen carbonate and immediately before use of the base components. In the case of technical uses, this working up preferably takes place via commercially usual two component mixing and dosing plant by means of static or dynamic mixing principle.

The mixtures resulting according to the above described process foam and solidify at temperatures of 20° within 10 to 20 minutes to give a soft elastic foam with fine, uniform cell structure. In the case of use of 5% methyl triacetoxysilane in the silicone mixture to be foamed and of a mole number of ammonium hydrogen carbonate corresponding to the mole number of acetoxy groups, the achievable volume increase lies at about 100–200%. By increase of the proportion of acetoxysilane and ammonium hydrogen carbonate in the total mixture, the volume increase can be increased.

If the mixing of the foam components takes place at increased temperatures (up to 70° C.), then, as is to be expected, this leads to a distinctly quicker hardening and to greater volume increase.

The foams according to the invention adhere inherently to substrates of glass, ceramic, wood, pigments and lacquers, concrete, plaster, metals and synthetic materials. Therefore, they are advantageously used as sealing foams on the above-mentioned materials but are also suitable as protective coatings for electrical or thermal insulation, for vibration reduction and also as form masses for the production of impressions or of other formed parts which are suitably produced from foamed elastomers.

In the following, the invention is explained in more detail on the basis of an example:
100 parts by wt. of a component I consisting of
60.55 parts by wt. of an α,Ω-dihydroxydimethylpolysiloxane with a viscosity of 20,000 mPas,
5.55 parts by wt. ethyl triacetoxysilane,
2.60 parts by wt. of a highly dispersed silicic acid with a specific surface according to BET of about 50 m²/g,
15.10 parts by wt. of an iron oxide pigment,
15.10 parts by wt. of a quartz meal,
0.01 part by wt. dibutyl tin dilaurate, are homogeneously mixed together at room temperature with 20 parts by wt. of a component II consisting of 72 parts by wt. of an α,Ω-dihydroxydimethylpoly-siloxane with a viscosity of 6,000 mPas, 3 parts by wt. of a highly dispersed silicic acid with a specific surface according to BET of about 110 m²/g, 25 parts by wt. ammonium hydrogen carbonate with a grain fineness of <50 µm.

The mixture obtained of the components foams at temperatures of 20° C. within 20 minutes to give a mechanically loadable elastomer foam with uniform cell structure. The density of the foam lies at 0.6 g/cm³. In the case of the silicone base components used, during this time there is shown only a slight skin formation due to cross-linking because of the moisture of the surrounding atmosphere.

If one brings the mixed foam components on to surfaces of glass, glass ceramic, enamel or porcelain, then the resulting foam binds with these materials so that it can only be removed from the surfaces by mechanical destruction.

If one stores samples of the resulting foam for 50 days at a temperature of 250° C., then, in the case of the vulcanisate, there is a weight loss of 10%. The strength and ductility of the foam is hereby maintained.

I claim:

1. A process for foaming a mixture of a bifunctionally terminated diorganopolysiloxane and a acyloxysilane cross-linking agent, comprising adding to the mixture a sufficient amount of a hydrogen carbonate compound to neutralize the acid in a foam composition, wherein the hydrogen carbonate compound has a cation portion comprising an amino nitrogen bearing entirely hydrogen substituents or at least one alkyl substituent.

2. A process according to claim 1, wherein the hydrogen carbonate compound is present as powder with a grain size of below 50 μm and is pre-suspended with the diorganopolysiloxane or a silicone oil.

3. A process according to claim 1, further comprising adding to the polysiloxane mixture and/or to the hydrogen carbonate compound a filling material.

4. A process according to claim 1, wherein the diorganopolysiloxane is a compound of formula I

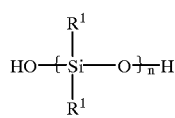 (I)

in which

R$^1$ are saturated or unsaturated hydrocarbon radicals with 1–10 C-atoms, optionally substituted with halogen or cyano groups, wherein the radicals R$^1$ within the polymer chain can be of different construction, and n is a whole number from 1500 to 10,000 and, said cross-linking agent comprises a compound of formula II

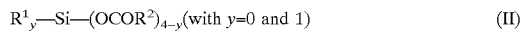 (II)

wherein

R$^2$ is a monovalent saturated hydrocarbon radical with 1 to 15 carbon atoms.

5. A process according to claim 4, wherein the compound of formula I has a viscosity of 6,000 to 350,000 mPas.

6. A process according to claim 1, further comprising adding to the mixture at least one selected from pigments and soluble dyestuffs, stabilisers against oxidation and the action of heat, dispersers, reaction catalysts, fungicides, adhesives, solvents, flame protection agents, plasticisers, and filling materials.

7. A silicone foam produced by a process according to claim 1.

8. A method of treating surfaces using the silicone foam of according to claim 7 comprising coating a substrate selected from glass, ceramic, wood, pigments, lacquers, concrete, plaster, metals, synthetic materials and sealing and formed masses.

9. A process according to claim 3, wherein the filling material is highly dispersed silicic acid.

10. A process according to claim 6, wherein the strengthening filling materials are graphite or carbon black.

11. A process according to claim 6, wherein the filling materials are passive filling materials selected from the group consisting of calcium carbonate, silicates, quartz meal, glass and carbon fibers, diatomaceous earth, metal powder, and metal oxides.

12. A process according to claim 1, wherein the hydrogen carbonate compound is ammonium hydrogen carbonate.

13. A process according to claim 1, wherein the diorganopolysiloxane comprises α,Ω-dihydroxydimethylpolysiloxane, and the acyloxysilane cross-linking agent comprises ethyl triacetoxysilane.

* * * * *